US006953103B2

(12) United States Patent
DeBarr

(10) Patent No.: US 6,953,103 B2
(45) Date of Patent: Oct. 11, 2005

(54) METHOD FOR INSTALLING FLEXIBLY COUPLED ELECTRIC POWER ASSIST STEERING SYSTEM

(75) Inventor: Michael Joseph DeBarr, Belleville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/631,578

(22) Filed: Jul. 30, 2003

(65) Prior Publication Data

US 2004/0020707 A1 Feb. 5, 2004

Related U.S. Application Data

(62) Division of application No. 10/014,688, filed on Dec. 11, 2001, now Pat. No. 6,681,886.

(51) Int. Cl.$^7$ .................................................. B62D 5/04
(52) U.S. Cl. ...................................................... 180/444
(58) Field of Search ................................ 180/443, 444, 180/446

(56) References Cited

U.S. PATENT DOCUMENTS

| | | | | | |
|---|---|---|---|---|---|
| 3,927,899 | A | | 12/1975 | Bough | |
| 3,940,945 | A | | 3/1976 | Härdmark et al. | |
| 4,241,804 | A | * | 12/1980 | Deininger et al. | 180/446 |
| 4,703,821 | A | | 11/1987 | Shimizu | |
| 4,743,817 | A | | 5/1988 | Shimizu | |
| 4,862,982 | A | * | 9/1989 | Saito et al. | 180/443 |
| 5,333,700 | A | * | 8/1994 | Mouri | 180/444 |
| 5,392,874 | A | * | 2/1995 | Chandler | 180/444 |
| 5,743,352 | A | | 4/1998 | Miller et al. | |
| 5,979,587 | A | | 11/1999 | Liubakka et al. | |
| 6,164,407 | A | * | 12/2000 | Cheng | 180/444 |
| 6,250,419 | B1 | | 6/2001 | Chabaan et al. | |
| 6,328,128 | B1 | * | 12/2001 | Chikaraishi | 180/446 |
| 6,488,115 | B1 | * | 12/2002 | Ozsoylu et al. | 180/444 |
| 6,520,274 | B1 | * | 2/2003 | McElmeel et al. | 180/444 |
| 6,523,637 | B1 | * | 2/2003 | Nakano et al. | 180/402 |
| 6,681,886 | B2 | * | 1/2004 | DeBarr | 180/443 |

FOREIGN PATENT DOCUMENTS

| | | |
|---|---|---|
| GB | 0207865.7 | 6/2002 |
| GB | 0207865.7 | 10/2002 |
| JP | 6239250 A | 8/1994 |
| JP | 6293268 A | 10/1994 |

* cited by examiner

*Primary Examiner*—Avraham Lerner
(74) *Attorney, Agent, or Firm*—Brinks Hofer Gilson & Lione

(57) ABSTRACT

A method for installing an electric power assist steering system, which includes an electric motor with an output shaft, and a flexible shaft operatively connected to the output shaft. In a preferred embodiment, the flexible shaft is also operatively connected to the input shaft of a pinion gear for a rack and pinion steering mechanism. The present invention increases the engine compartment utilization efficiency while also increasing the ease of repair, installation, and removal of engine, steering system and other vehicle components in the engine compartment.

19 Claims, 4 Drawing Sheets

METHOD FOR INSTALLING FLEXIBLY COUPLED ELECTRIC POWER ASSIST STEERING SYSTEM

PRIORITY

This application is a divisional application of U.S. Pat. No. 6,681,886 issued Jan. 27, 2004, which is incorporated by reference as if reproduced in full below.

FIELD OF THE INVENTION

This invention relates generally to the field of vehicle steering systems, and more particularly relates to method for installing an electric power assist steering system having an electric motor flexibly coupled to a vehicle steering system.

DESCRIPTION OF THE RELATED ART

A Typical Steering System

A typical steering system for a motor vehicle is illustrated in FIG. 1. The steering system 1 has rotating steering wheel 2 in the passenger compartment of the vehicle mounted to steering column 3 that is operatively connected to wheels 4 via steering assembly 5. In order to reduce the amount of driver effort (i.e., torque) that is required to rotate the steering wheel, many steering systems include a power-assisted actuator. The actuator assists the operator with rotation of the steering wheel to overcome opposing forces such as road load forces on the road wheels and friction forces in the steering assembly. The amount of power assistance generally varies depending on the speed of the vehicle and the amount of effort applied by the vehicle operator to the steering wheel. Conventional power assist steering systems typically employ either hydraulic power assist or electric power assist mechanisms. Electric power assist mechanisms are being used in an increasing number of vehicles due to their reduced size and higher energy efficiency than hydraulic mechanisms.

Electric Power Assist Systems

An electric power assist steering (EPAS) system employs an electric motor for applying a controlled amount of torque to the steering assembly to assist the operator with rotation of the steering wheel. For example, the system illustrated in FIG. 1 includes electric motor 6 for power assist, and controller 7. The steering assembly may be a rack and pinion type that converts angular rotation of the steering wheel into a sliding motion of a rack to steer the wheels. The rack interacts with teeth on an assist pinion that is driven by the output shaft of motor 6 in response to signals from controller 7. The signals from controller 7 are designed to provide a relatively constant torque at the driver pinion.

An example of an EPAS rack and pinion assembly 10 is illustrated in FIG. 2. Inner tie rods 12 are connected to a rack and pinion mechanism contained within housing 14. Gear box 16 contains a gear reduction mechanism for the assist pinion. Electric motor 18 is rigidly mounted to gear box 16 to power the assist pinion via the gear reduction mechanism. The motor output shaft directly connects to an input shaft, which may be implemented as a worm gear shaft, in the gear reduction mechanism. A driver pinion torque sensor, as well as various other sensors, may also be included, but the driver pinion and sensors are not shown to simplify the present description. The measured torque at the driver pinion serves as an approximation of the input torque applied to the steering wheel by the vehicle operator and is commonly used to determine the amount of torque assist to be provided by the electric motor to the assist pinion. Further information about electric power assist steering systems can be found in various patents and literature references, including but not limited to U.S. Pat. No. 5,743,352, to Miller et al., and U.S. Pat. No. 6,250,419, to Chabaan et al., both of which are incorporated by reference as if reproduced in full herein.

Concerns over fuel efficiency have led to the production of smaller vehicles and/or vehicles with more aerodynamic shapes to reduce wind resistance. Due to limitations on reducing the size of the passenger compartment and concerns about passenger compartment comfort, the size of vehicle engine compartments has been reduced and their shape varied to accommodate smaller vehicle sizes and/or new vehicle body designs. The demand for more features while maintaining or increasing vehicle performance have led to an increasing number of components in smaller vehicle engine compartments which have various shapes.

An electric power assist steering system offers variable assist capabilities, more efficient energy consumption, reduced mechanism complexity, increased reliability, and responsive on-demand steering assist, as well as other advantages. Conventional steering systems and components are available from TRW, having facilities in Livonia Mich., USA, Delphi Automotive Systems, having facilities in Saginaw, Mich., USA, and NSK Ltd., having offices in Tokyo, Japan. However, the electric motor increases the size of the system, and rigid attachment of the electric motor to the rack and pinion assembly leaves little flexibility for more efficient engine compartment design and component placement. For example, the typical steering gear has a length of about 1520 mm, inclusive of the tie rods, while a typical power steering motor has a length of at least about 150 mm and a diameter of at least about 100 mm. A conventional power steering system constructed in this manner makes an unwieldy combination. Further, the bulky projection created by the motor rigidly mounted to the assembly makes it more difficult to work on, install, or remove the engine, steering system or other vehicle components in the engine or power source compartment.

As used herein, engine compartment shall refer to the vehicle compartment for an internal combustion engine power source, hybrid internal combustion engine with electric motor power source, or other vehicle power source type.

Accordingly, it is desired to provide an electric power assist steering system that increases the engine compartment utilization efficiency while also increasing the ease of repair, installation, and removal of engine, steering system and other vehicle components in the engine compartment.

SUMMARY OF THE INVENTION

In accordance with the teachings of the present invention, a steering system and method of installing a power assist steering assembly in a vehicle are disclosed. According to one aspect of the present invention, an electric power assist steering system is provided in which an electric motor is operatively engaged via a flexible coupling with the remainder of the steering system for supplying torque assist. In another aspect, a motor for power assist steering systems is disclosed having a rotating output shaft and a flexible shaft connected thereto for transferring power. A method of installing a steering system in a vehicle is also disclosed wherein the electric motor is installed independently of and then flexibly coupled to the remaining steering system components. The electric motor output shaft is located at a remote location from the pinion shaft or input shaft of the pinion gear reduction mechanism. The steering system, motor, and method of the present invention provide for greater flexibility in engine compartment design and component placement efficiency, and facilitate repair, installation, and removal of engine and steering system components.

These and other features, advantages and objects of the present invention will be further understood and appreciated by those skilled in the art by reference to the following specification, claims and appended drawings. It is to be understood that both the preceding summary and the detailed description that follows are intended merely to be exemplary and to further explain the invention claimed. The invention may be better understood by reference to the following detailed description read in conjunction with the accompanying drawings.

DETAILED DESCRIPTION OF THE INVENTION

Figure 1:
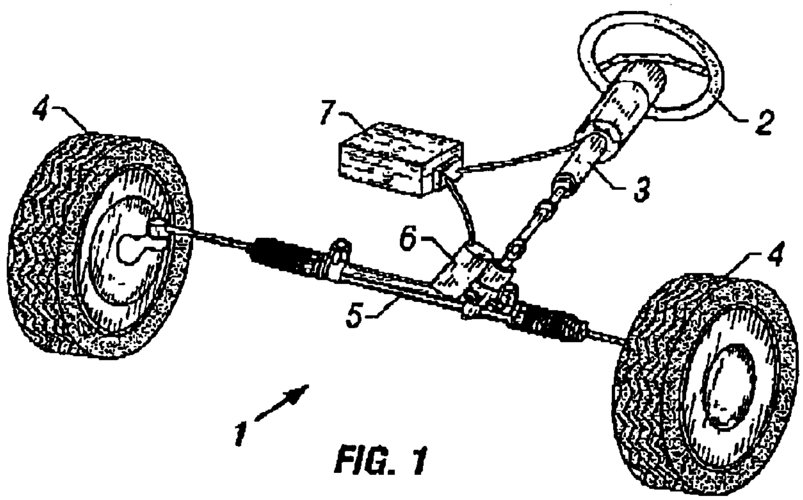
FIG. 1 illustrates a typical vehicle steering system.
Figure 2:
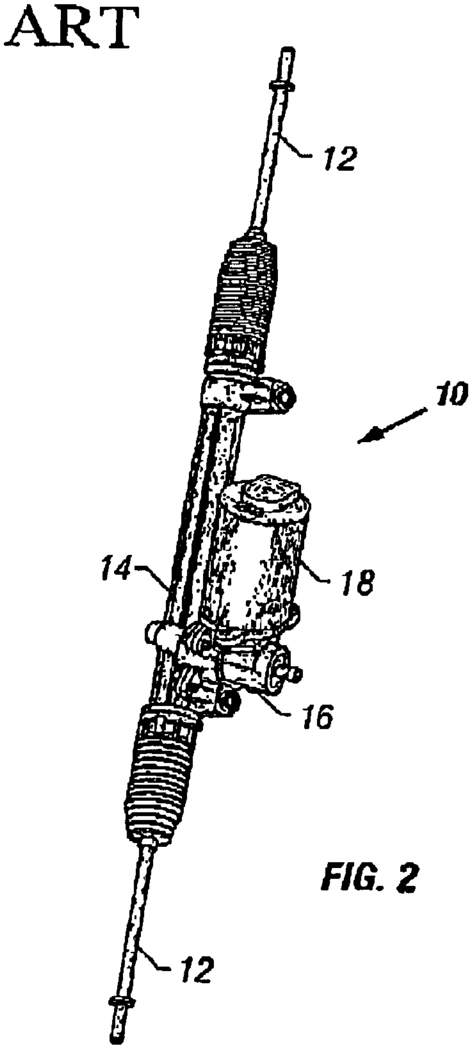
FIG. 2 illustrates a rack and pinion steering mechanism of an electric power assist steering system, in which the electric motor is rigidly attached to the assist pinion gear reduction mechanism.
Figure 3:
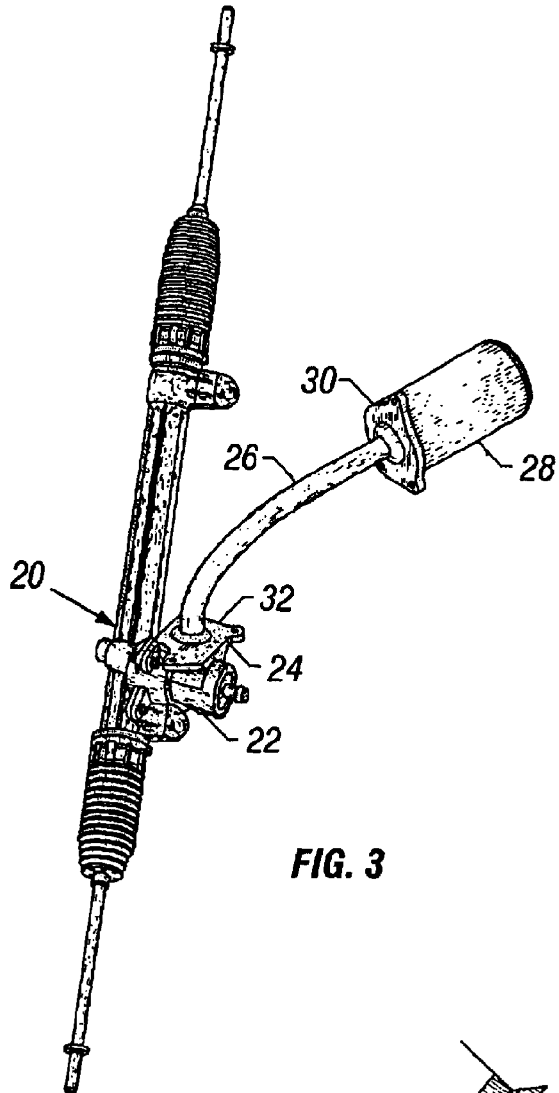
FIG. 3 illustrates an embodiment of a rack and pinion steering mechanism of an electric power assist steering system of the present invention, in which the electric motor is flexibly coupled to the assist pinion gear reduction mechanism.

An embodiment of the present invention may be better understood with reference to FIG. 3. Rack and pinion mechanism 20, such as that shown in FIG. 2, includes assist pinion gear reduction housing 22 that includes coupling fitting 24 for coupling 26. Coupling 26 couples electric motor 28 to the assist pinion gear reduction mechanism. In this embodiment, a conventional electric motor used in electric power assisted steering mechanisms and a conventional assist pinion gear reduction mechanism and housing are used. Therefore the bolt holes on and dimensions of flanged plate 30 of the motor housing correspond to those of flanged plate 32 on gear reduction mechanism housing 22.

It has been surprisingly discovered that the assist motor can be remotely attached by a flexible coupling to the assist pinion without a substantial decrease in performance of the steering system.

In a preferred embodiment, coupling 26 includes an outer flexible sleeve or conduit that contains a flexible shaft. The flexible shaft is connected to the motor output shaft at one end and to the gear reduction mechanism input shaft at its opposite end. The flexible shaft may be formed of steel or synthetic fiber that minimizes the loss of torque between the motor and pinion gear mechanism despite being flexible. Non-limiting examples of flexible couplings suitable for use with the present invention can be obtained from Motion Industries of Wichita Falls, Tex., and Dearborn, Mich., USA, and Stock Drive Products/Sterling Instrument of New Hyde Park, N.Y., USA. In addition to flexible shafts, it is contemplated that the electric motor may be coupled to the steering system via a single or double universal jointed shaft, in which the shaft has at least two rigid linear steel segments connected via at least one universal joint. A non-limiting example of a source for a suitable assist motor is Visteon Global Technologies, Inc. of Dearborn, Mich., USA or affiliate thereof, and a non-limiting example of a source for an assist pinion gear reduction mechanism is Nissei Corporation, Japan.

Figure 4:
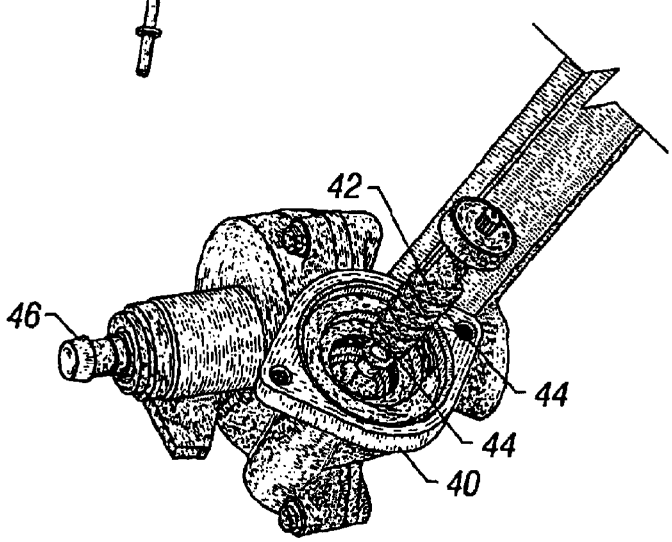
FIG. 4 is an exploded perspective view of an embodiment of an assist pinion gear reduction mechanism housing, showing the worm drive gear detached therefrom.

With reference to FIG. 4, an example of an assist pinion gear reduction mechanism suitable for use with the present invention is illustrated. Gear reduction housing 40 provides for insertion of worm drive shaft 42. Worm drive shaft 42 includes worm screw threads 44 that engage gears in housing 40. Rotation of worm drive shaft 42 leads to rotation of assist pinion shaft 46.

Figure 5:
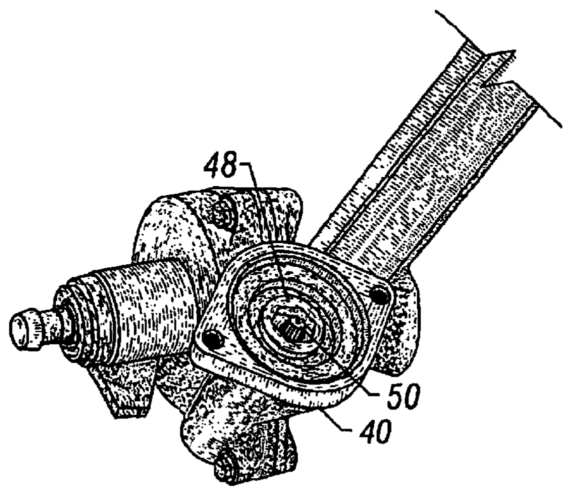
FIG. 5 is a perspective view of an embodiment of an assist pinion gear reduction mechanism housing, showing the worm drive gear inserted therein with its splined end projecting therefrom.

With reference to FIG. 5, worm drive shaft 42 is rotatably mounted in housing 40 by bolt 48. Shaft 42 may include threads on its outer perimeter, or some other attachment mechanism for connection to the sleeve or outer conduit of flexible coupling 26. Worm drive shaft 42 preferably includes a splined hub 50 for connection to a corresponding fitting on the end of the flexible coupling shaft. A similar splined hub on the electric motor output shaft is connected to a corresponding fitting on the motor end of the flexible coupling shaft in like fashion.

An Exemplary Flexible Coupling

Figure 6:
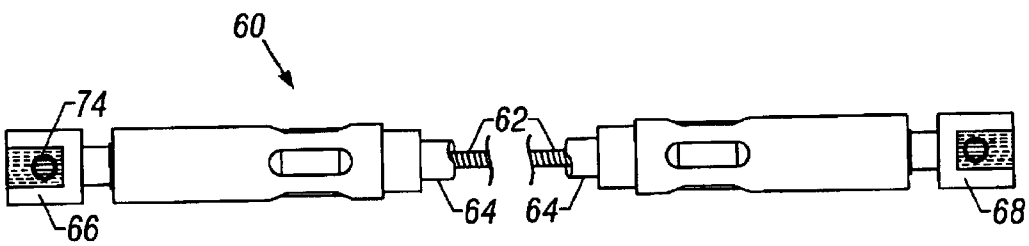
FIG. 6 is a side elevation view of the end portions of an exemplary coupling for use with the present invention, in which a portion of the casing has been cut-away to reveal the flexible shaft.

With reference to FIG. 6, an exemplary embodiment of a flexible coupling for use with the present invention is illustrated. Flexible shaft 62 is contained within flexible sleeve 64, the latter being partially cutaway to show shaft 62 contained therein. Shaft 62 is continuous, but shown in cut and truncated form to facilitate illustration. Shaft 62 may have a length ranging from about 1 inch up to about 48 inches. However, in a preferred embodiment, shaft 62 is about 24 inches or less in length. Suitable flexible shafts are made of steel, and have diameters ranging from about 0.1 inch to about 0.75 inch depending on the operating requirements. In a preferred embodiment, the shaft has a diameter of about 0.25 inches for use in small to mid-sized cars. Larger diameter shafts may be required for larger vehicles.

Flexible sleeve 64 may be formed of vinyl-covered steel, and its diameter will depend in part on the diameter of shaft 62. For example, the diameter of shaft 62 may be ½ inch when the shaft is ¼ inch or less in diameter. Sleeve 64 may contain bearings to prevent wear upon contact with shaft 62 when it is rotating.

Figure 7:
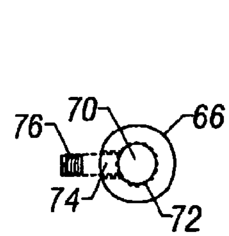
FIG. 7 is a cross-sectional end view of the end fitting of the coupling of FIG. 7 shown in exploded relationship to a set screw.

End fittings 66 and 68 are bonded to the ends of shaft 62. With reference to FIG. 7, a cross sectional end view of end fitting 66 is illustrated. Fitting 66 includes a generally cylindrically shaped opening 70 which may be placed over the input hub of a power steering gear reduction mechanism, such as hub 50 in FIG. 5. Fitting 66 includes splines 72 on its interior wall designed to engage corresponding splines on an input hub. However, other gripping mechanisms may be employed or the interior wall of fitting 66 may be smooth.

A bore 74 is provided in fitting 66 to provide for a set screw, such as screw 76. Use of a set screw may require that the input hub on the power steering gear mechanism be sufficiently long to permit tightening of set screw 76 to the hub. More than one bore may be provided for a plurality of set screws, particularly for larger diameter shafts that may encounter high torque demands. Fittings 66 and 68 may be of plated steel or other suitable material. The sheathing for the flexible coupling may have an extended cowl at either end to cover the rotating fittings 66 and 68.

In general, the minimum operating radius of curvature for the flexible shaft increases with shaft diameter. As radius of curvature increases, the dynamic torque capacity of the shaft increases. Thus, it is preferred that the electric motor output shaft be aligned with the input hub of the power steering input shaft or gear in order to optimize the radius of curvature to the performance requirements. Performance data for exemplary flexible shafts is provided in Table 1 below.

A preferred source for flexible shafts is Stock Drive Products/Sterling Instrument of New Hyde Park, N.Y., USA. Non-limiting examples include Catalog Numbers A 7Z10-N24433, A 7Z10-N24533, A 7Z10-N36533, A 7Z10-N30633, A 7Z10-N36633, A 7Z10-N24833, A 7Z10-N36833. As noted above, a single or double universal jointed shaft may be used in place of the flexible shaft, preferably including a flexible rubber sleeve over the joints. A preferred double universal jointed shaft may provide a maximum working angle of approximately 70 degrees, and is available from Belden Incorporated, Broadview, Ill., USA. Non-limiting examples of suitable double universal shafts for use with the present invention include Belden Incorporated part numbers DUJ375, DUJ500, DUJ625, DUJ750, UJ-DD375, UJ-DD500, UJ-DD625 and UJ-DD750.

TABLE 1

PERFORMANCE DATA FOR EXEMPLARY FLEXIBLE SHAFTS

| Shaft Diameter | Minimum Operating Radius | Dynamic Torque Capacity Winding Direction (lb. In.) Input Radius of Curvature (In.) | | | | | | | | Torsional Breaking Load For Straight Shafts, Winding Direction |
|---|---|---|---|---|---|---|---|---|---|---|
| (In.) | (In.) | 25 | 20 | 15 | 12 | 10 | 8 | 6 | 4 | (lb. In.) |
| 0.130 | 3.0 | | | 3.8 | 3.6 | 3.4 | 3.1 | 2.4 | 1.7 | 15 |
| 0.150 | 4.0 | | | 5.0 | 4.7 | 4.4 | 3.9 | 3.1 | 1.4 | 24 |
| 0.187 | 4.0 | | 13.5 | 12.6 | 11.8 | 11.0 | 9.8 | 7.8 | 4.0 | 55 |
| 0.250 | 4.0 | 25.0 | 24.0 | 22.0 | 21.0 | 19.0 | 16.0 | 12.0 | | 100 |

In a preferred embodiment, an electric motor is flexibly coupled to a conventional rack and pinion steering mechanism, which is incorporated into a conventional steering system. However, it is envisioned that the present invention may be adapted to column as well as dual pinion steering systems, and to many different vehicle types, such as but not limited to the Ford Focus, Saturn SUV, and Honda S2000.

Exemplary Methods for Installing an Electric Power Assist Steering System

Figure 8:
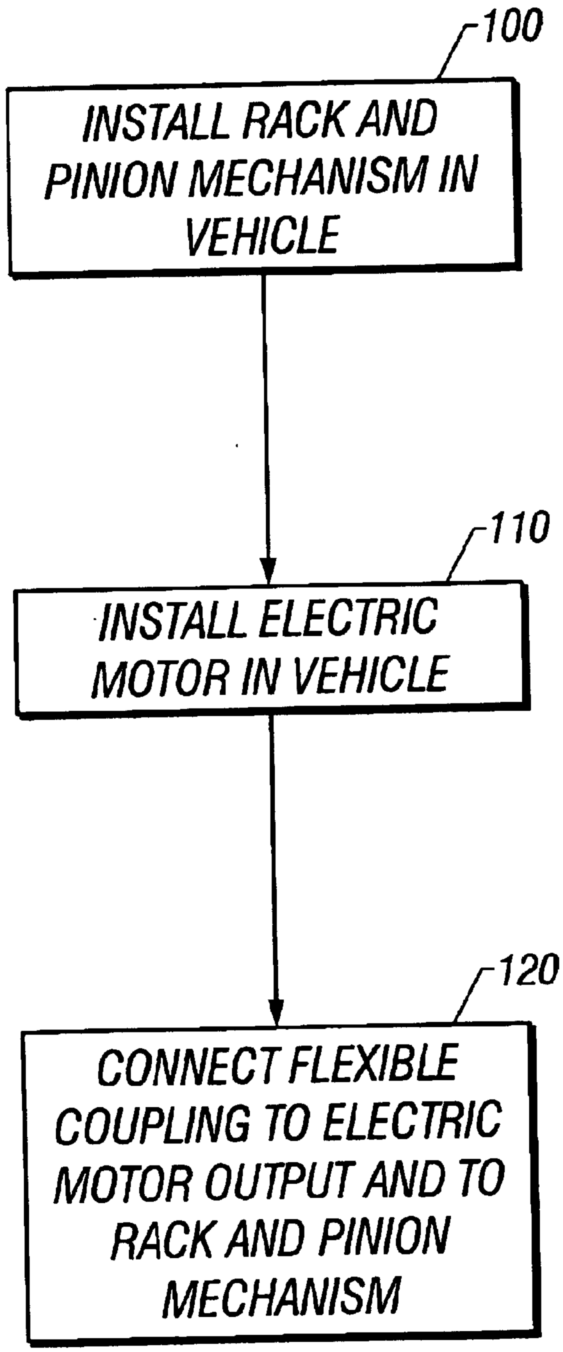
FIG. 8 is a flow chart for an exemplary method of installing an electric power assist steering system in a vehicle in accordance with the present invention.

In an embodiment, a power assist steering system is installed in a vehicle by installing the electric motor independently of the rack and pinion mechanism and/or gear reduction mechanism. For example, with reference to FIG. 8, in a first step 100 of an exemplary method, the rack and pinion mechanism is installed. In a second step 110, an electric motor suitable for providing power assist to the rack and pinion mechanism is installed. In a third step 120, the electric motor output is coupled to the input of the rack and pinion mechanism by connection of the flexible coupling to the electric motor output and to the input of the rack and pinion mechanism.

Preferably, the electric motor is mounted away from heat and road splash, and the motor output shaft remains as "in-line" as possible with the power assist pinion input. In general, the higher the torque requirements, the more the motor output shaft should be in linear alignment with the power steering input shaft hub. By placing the motor closer to the electric power source, additional economies can be obtained. The flexible coupling provides for numerous variations in the method of installation, which may be optimized depending on the vehicle, engine, and other considerations. Some exemplary methods are described in Table 2 below.

As one of skill in the art will recognize, the longer the flexible coupling between the motor output and steering gear input, the greater the potential loss of torque between the motor and input gear. Further, the dynamic torque

TABLE 2

EXEMPLARY METHODS FOR INSTALLING AN ELECTRIC POWER ASSISTED STEERING SYSTEM OF THE PRESENT INVENTION IN A VEHICLE

| STEP | NOTES |
|---|---|
| Electric Motor Installation | Install a suitable electric assist motor for providing power to a compatible steering mechanism in the desired engine compartment location, preferably away from road splash. The electric motor output shaft preferably faces in the general direction of the location where the steering mechanism is or is to be installed, but at a distance therefrom. |

TABLE 2-continued

EXEMPLARY METHODS FOR INSTALLING AN ELECTRIC POWER ASSISTED STEERING SYSTEM OF THE PRESENT INVENTION IN A VEHICLE

| STEP | NOTES |
|---|---|
| Steering Mechanism Installation | Install a steering mechanism in the desired engine compartment location. The input shaft of the steering mechanism should face in the general direction of the location where the electric power assist motor output shaft is or is to be installed, but is remote therefrom. The angle between the steering mechanism input shaft and the electric motor output shaft is preferably less than about 90 degrees, and in an embodiment less than about 15 degrees. This step may be performed before the Electric Motor is installed. |
| Coupling Electric Motor To Steering Mechanism | The electric motor may be coupled to one end of the flexible coupling prior to its installation. Alternatively, one end of the flexible coupling can be coupled to the steering mechanism input shaft prior to installation of the steering mechanism in the engine compartment. This latter technique may be helpful where the steering mechanism input shaft is hard to reach after installation. Connection of the free end of the coupling is done after both the electric assist motor and steering mechanism |

TABLE 2-continued

EXEMPLARY METHODS FOR INSTALLING AN ELECTRIC POWER ASSISTED STEERING SYSTEM OF THE PRESENT INVENTION IN A VEHICLE

| STEP | NOTES |
| --- | --- |
| | are installed in the engine compartment. In an alternative embodiment, the motor and steering mechanism are coupled together prior to installation, with the flexible coupling making it easier to manipulate the entire apparatus into the engine compartment. |

capacity is lower with a lower radius of curvature, so that the angle and distance between the motor output and steering gear input should be optimized for particular applications. In preferred embodiments, the distance between the motor output and the input gear is less than about 36 inches, and is preferably equal to or less than about 24 inches, and the angle between the motor output and the input gear is less than about 90°, and is preferably less than about 45°. In one embodiment, the flexible shaft is between about 1 inch and about 24 inches in length, and the angle between the motor output shaft and the gear input is between about 0° and about 30°. In another embodiment, the angle between the motor output shaft and the gear input is between about 0 degrees and about 15 degrees. Embodiments also include shafts of 6 inch and 12 inch length.

While embodiments of a new electric power assist steering system and methods of installing same have been disclosed as examples herein, there could be a wide range of changes made to these embodiments without departing from the present invention. For example, it is envisioned that the reduction gear mechanism may be rigidly connected to the electric motor, and the output from the reduction gear mechanism flexibly coupled to an assist pinion input in the same fashion as the electric motor is flexibly coupled to the assist pinion gear reduction mechanism input shaft described above. Thus, it is intended that the foregoing detailed description be regarded as illustrative rather than limiting and that it be understood that it is the following claims, including all equivalents, which are intended to define the scope of the invention.

What is claimed is:

1. A method for installing an electric power assisted steering system in a vehicle, said method comprising the steps of:

installing in a vehicle an electric motor for providing power to a steering mechanism, the electric motor having an output shaft, installing in the vehicle a steering mechanism that can be operatively connected to the electric motor, wherein the steering mechanism has an input shaft, the electric motor and the steering mechanism being installed independently of each other and the electric motor being installed at a location wherein the output shaft of the electric motor is at a remote location from the input shaft; and connecting the electric motor output shaft to the steering mechanism input shaft via a flexible shaft.

2. The method of claim 1, further comprising the step of connecting the steering mechanism input shaft to a first end of a flexible shaft prior to installing the steering mechanism in the vehicle.

3. The method of claim 1, further comprising the step of connecting the electric motor output shaft to a second end of a flexible shaft prior to installing the electric motor in the vehicle.

4. The method of claim 2, wherein the flexible shaft has a second end, said method further comprising the step of coupling the second end of the flexible shaft to the electric motor output shaft.

5. The method of claim 3, wherein the flexible shaft has a first end, said method further comprising the step of coupling the first end of the flexible shaft to the steering mechanism input shaft.

6. The method of claim 1, wherein the flexible shaft comprises steel.

7. The method of claim 1, wherein the steering mechanism and the motor are installed so that the angle between the input shaft and the output shaft is less than about 90 degrees.

8. The method of claim 1, wherein the steering mechanism and motor are installed so that the angle between the input shaft and the output shaft is less than about 15 degrees.

9. The method of claim 6, wherein the flexible shaft has a length between about 1 inch and about 36 inches, and a diameter between about 0.1 inches and about 0.75 inches.

10. The method of claim 1, further comprising installing a flexible sleeve having a motor end and a steering mechanism end, a first coupling at the first end of said flexible shaft and a second coupling at the second end of the flexible shaft, wherein the flexible sleeve is installed so that it surrounds at least a portion of the flexible shaft, the motor end of the sleeve is connected to the housing of the motor, the steering mechanism end of the sleeve is connected to the gearbox housing of the steering mechanism, wherein the second coupling couples the flexible shaft to the output shaft of the electric motor, and the first coupling couples the flexible shaft to the input shaft of a gear reduction mechanism in the gearbox of the steering mechanism.

11. The method of claim 1, wherein the flexible shaft has a dynamic torque capacity between about 1.4 pound inch and about 25 pound inch.

12. The method of claim 9, wherein the flexible shaft has a dynamic torque capacity between about 1.4 pound inch and about 25 pound inch.

13. The method of claim 10, wherein the flexible shaft has a dynamic torque capacity between about 1.4 pound inch and about 25 pound inch.

14. A method for installing an electric power assisted steering system in a vehicle, said method comprising the steps of:

installing in a vehicle an electric motor for providing power to a steering mechanism, the electric motor having an output shaft, and installing in the vehicle a steering mechanism that can be operatively connected to the electric motor, wherein the steering mechanism has an input shaft, wherein the electric motor is installed at a location so that the output shaft of the electric motor is at a remote location from the input shaft of the steering mechanism input shaft and is connected thereto via a flexible shaft.

15. The method of claim 14, wherein the electric motor and the steering mechanism are installed in the vehicle independently of each other and connected via the flexible shaft after installation.

16. The method of claim 14, wherein the steering mechanism and motor are installed so that the angle between the input shaft and the output shaft is less than about 90 degrees.

17. The method of claim 14, wherein the flexible shaft has a length between about 1 inch and about 36 inches, and a diameter between about 0.1 inches and about 0.75 inches.

18. The method of claim 17, wherein the steering mechanism and motor are installed so that the angle between the input shaft and the output shaft is less than about 15 degrees.

19. The method of claim 18, wherein the flexible shaft comprises steel and has a dynamic torque capacity between about 1.4 pound inch and about 25 pound inch.

* * * * *